R. L. WILLIAMSON.
POWER TRANSMITTING MECHANISM.
APPLICATION FILED DEC. 3, 1917.

1,293,596.

Patented Feb. 4, 1919.
2 SHEETS—SHEET 1.

Inventor
Romeo L. Williamson

Witness
A. Sundell

By
C. C. Shepherd Attorney

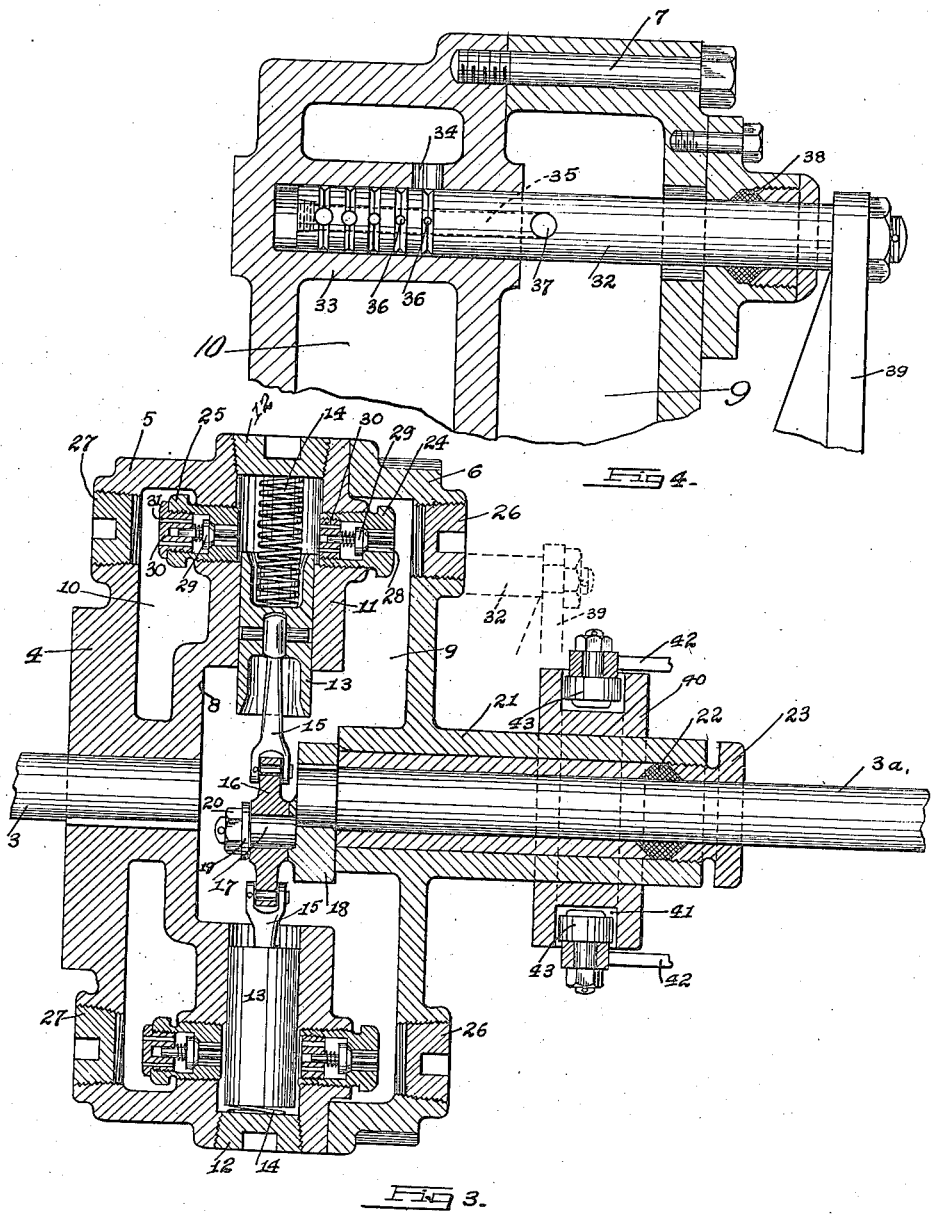

UNITED STATES PATENT OFFICE.

ROMEO L. WILLIAMSON, OF MOUNT VERNON, OHIO, ASSIGNOR TO THE WILLIAMSON HYDRAULIC MACHINE COMPANY, OF MOUNT VERNON, OHIO, A CORPORATION OF OHIO.

POWER-TRANSMITTING MECHANISM.

1,293,596.     Specification of Letters Patent.     Patented Feb. 4, 1919.

Application filed December 3, 1917. Serial No. 205,010.

*To all whom it may concern:*

Be it known that I, ROMEO L. WILLIAMSON, a citizen of the United States, residing at Mount Vernon, in the county of Knox and State of Ohio, have invented certain new and useful Improvements in Power-Transmitting Mechanism, of which the following is a specification.

My invention relates to power transmission mechanism and is designed principally as an improved connecting link between a driving and driven shaft. Further, the present invention is an improvement over that shown in my co-pending application filed August 3, 1917, Serial No. 184,184.

The purpose of the present structure is principally one wherein an indefinite number of speeds may be obtained between a driving and a driven shaft. To do this I have provided a member formed with a plurality of radially arranged cylinders, which cylinders coöperate with means provided on the driven shaft for operating their pistons. Fluid, preferably liquid, is used to function as a resisting medium for the movement of the pistons within their cylinders. In this connection, it is the main object of this invention to provide a member having a plurality of cylinders and a division wall structure dividing this member into high and low pressure compartments together with means for regulating the flow of liquid from the high to the low pressure compartment.

A further object of this invention resides in the specific wall structure wherein the cylinders open at their lower ends into the low pressure compartment whereby any leakage from the high pressure compartment is entirely eliminated.

Other objects of my invention will become more apparent after a further detailed description of the accompanying sheets of drawings, wherein similar characters of reference designate corresponding parts, and wherein—

Figure 1:
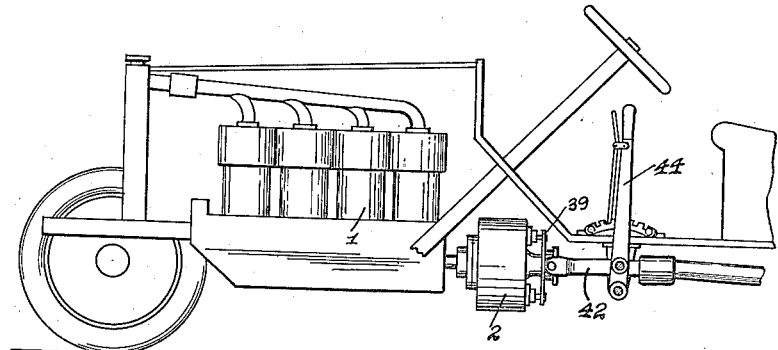
Figure 2:
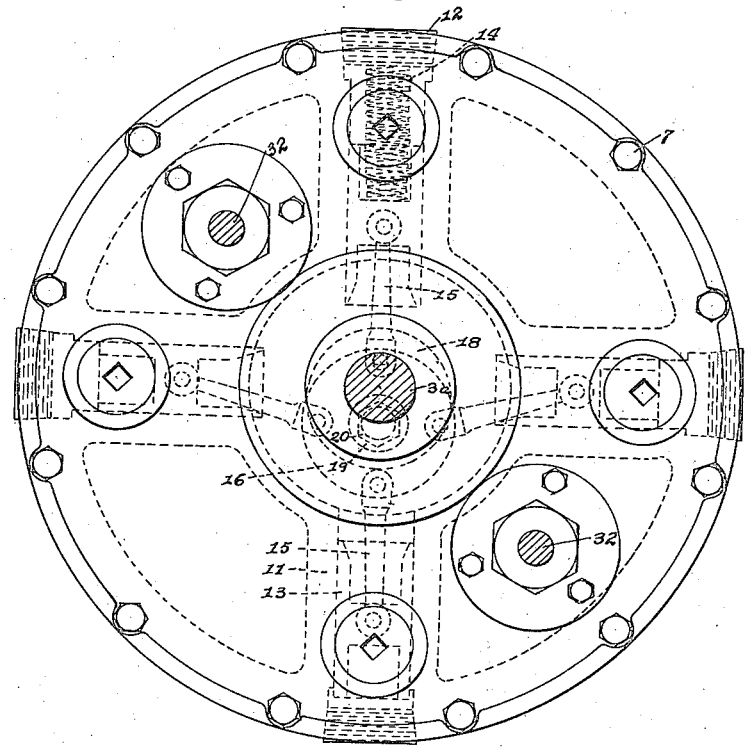

Figure 1 is a diagrammatic view of an automobile showing my transmission mechanism in its operating position, Fig. 2 is a side elevation of my improved transmission mechanism, Fig. 3 is a central vertical section taken through the structure shown in Fig. 2, and, Fig. 4 is an enlarged section taken through the regulating valve mechanism.

In Fig. 1 the vehicle engine is designated by reference numeral 1 and the transmission mechanism by the reference numeral 2. It will be understood that my invention is not particularly limited to an automobile, although well adapted for this purpose. Broadly speaking, this invention is applicable as a transmission mechanism between any driving and driven shafts.

In Fig. 3, the driving or engine shaft is designated 3 while the driven shaft is designated 3ª. The driving shaft 3 rigidly carries a member 4 formed of sections 5 and 6 bolted together as may be desired by means of cap screws shown at 7. A dividing wall structure 8 is located within the member 4 and divides the same into a low pressure compartment 9 and a high pressure compartment 10. This wall structure is preferably formed integral with the part 5 and is also formed with a plurality of radially arranged cylinders 11. The upper ends of these cylinders are preferably closed by means of the caps 12 between which and the pistons 13, the springs 14 operate. Each of the pistons is provided with a connecting rod 15 which in turn is pivotally connected to a disk shown at 16, which disk in turn is rotatably mounted on a pin 17 carried by a second disk 18, the latter being rigidly mounted upon the driven shaft 3ª as is shown in Fig. 3. The disk 16 is rotatably held in position upon its pin 17 by means of the washer 19 and the nut 20 and the pin 17 is itself eccentrically mounted upon the disk 18 to function as a crank when the shaft 3ª is caused to rotate. This shaft 3ª is journaled in the bearing hub 21 integrally formed in connection with the part 6 of the member 4 and is also suitably packed by means of a packing shown at 22 and the cap 23.

From the description thus far given it will be apparent that the member 4 rotates with the driving shaft 3 and that during such rotation, the pistons 13 are moved in and out of their cylinders 11. As long as this movement of the pistons is not resisted the shaft 3ª will remain stationary. However, to offer this resistance I fill the low pressure compartment 9 with a liquid preferably oil and provide an inlet valve situated between each cylinder 11 and the low pressure compartment 9 and an outlet valve situated between each cylinder 11 and the high pressure compartment 10.

In Fig. 3, the cylinders are shown as being bored and threaded to receive the inlet cage members 24 and the outlet cage members 25. The plugs shown at 26 and 27 are merely for the purpose of gaining access to the cylinders to effect the machining to place the cages 24 and 25 in position. Each cage is provided with a valve seat and a plurality of openings 28 to coöperate with the valves 29. Each cage is further provided with a valve stem guide member 30 the latter being also provided with openings 31 to permit the free flow of liquid. Thus as each piston moves toward the center it acts as a pump and forces liquid through the inlet valve 29 into the space between the piston head and the plug 12. As these pistons then return this confined liquid is forced through the outlet valves 29 against the pressure formed in high pressure compartment 10 and into this compartment. If the outlet from the high pressure compartment is completely closed the forcing of additional liquid into it is impossible, which thus prevents the movement of the piston 13 and consequently locks the shaft 3ª in connection with the driving shaft 3. In this event, both the driving and driven shafts rotate at the same speed.

To obtain a reduction in speed between the two shafts, means as shown in Fig. 4 are provided for regulating the rate of out flow from the high pressure compartment into the low pressure compartment. As shown in Figs. 2 and 4, two valves 32 are provided each of which operates in a socket formation 33 connected with the part 5 of the high pressure side of the member 4, which socket member is provided with an opening 34 leading from the compartment 10 into the valve chamber in which the valve 32 operates. This latter is shown as being merely a stem provided with a longitudinal bore 35 and a plurality of lateral bores 36 of gradually increasing size. The stem is also provided with an annular groove for each of the apertures 36 as shown. A lateral bore 37 also leads from the longitudinal bore 35 into the low pressure compartment 9. It will thus appear that when the valves 32 are moved to the left from that as shown in Fig. 4, return connection between the high and low pressure compartment is entirely cut off. When the valves are moved to the position shown in Fig. 4 a small amount of the liquid is permitted to escape which amount is greatly increased as the larger apertures 36 are caused to register with the openings 34.

These valves 32 are suitably packed as shown at 38 and are each connected to a connecting piece 39 which latter is integrally formed in connection with the sliding collar 40, the latter being slidably mounted upon the hub or bearing 21. This collar is provided with an annular groove 41 within which the yoke member 42 carrying the rollers 43 operates. By an inspection of Fig. 1 it will be readily apparent in what manner these valves 32 are operated by means of the operating handle 44.

From the foregoing description taken in connection with the accompanying sheets of drawings it will be apparent that I have provided a transmission mechanism wherein leakage of the liquid is entirely eliminated. Fig. 3 shows that there are no bearings to operate out of the high pressure compartment 10, and should there be any leakage around the pistons 13, this leakage flows back into the low pressure compartment 9 within which all of the connecting rod and crank structures are located. Leakage out of the bearing 21 is reduced to a minimum because the liquid is held around the outer periphery of the member 4 due to the centrifugal force during the rotation.

What I claim is:

1. In a transmission mechanism of the character described, the combination with a driving and a driven shaft, of means for forming a driving connection between said shafts comprising a member rigidly carried by one of said shafts and provided with a plurality of cylinders, said member being divided into a high and a low pressure liquid compartment, said cylinders being located between said compartments, valve controlled passages leading from each compartment into said cylinders, pistons movable in said cylinders, means associated with the other of said shafts for coöperation with said pistons and arranged to successively move said pistons into their respective cylinders upon a relative rotative movement between said shafts, and means for controlling the rate of flow of liquid from the high to low pressure compartments.

2. In a transmission mechanism of the character described, the combination with a driving and a driven shaft, of means for forming a driving connection between said shafts comprising a member rigidly carried by one of said shafts and provided with a plurality of cylinders, said member being divided into a high and a low pressure liquid compartment, said cylinders being located between said compartments, valve controlled passages leading from each compartment into said cylinders, pistons movable in said cylinders, means associated with the other of said shafts for coöperation with said pistons and arranged to successively move said pistons into their respective cylinders upon a relative rotative movement between said shafts and a valve structure operating between said compartments for variably controlling the flow of liquid from the high to the low pressure compartment.

3. In a transmission mechanism of the character described, the combination with a driving and a driven shaft, of means for forming a driving connection between said shafts comprising a member rigidly carried by one of said shafts and provided with a plurality of radially arranged cylinders, said member being divided into a high and a low pressure liquid compartment by a division wall structure in which said cylinders are formed, said cylinders opening into said low pressure compartment at their lower ends, pistons movable in said cylinders, means carried by the other of said shafts for coöperation with said pistons and arranged to successively move said pistons into their respective cylinders upon a relative movement between said shafts, valve controlled passages leading from both the low and high pressure compartments into said cylinders above said pistons and means for controlling the rate of flow of liquid from one compartment to the other.

4. In a transmission mechanism of the character described, the combination with a driving and a driven shaft, of means for forming a driving connection between said shafts comprising a member rigidly carried by one of said shafts and provided with a plurality of radially arranged cylinders, said member being divided into a high and a low pressure liquid compartment by a division wall structure in which said cylinders are formed, said cylinders opening into said low pressure compartment at their lower ends, pistons movable in said cylinders, means carried by the other of said shafts for coöperation with said pistons and arranged to successively move said pistons into their respective cylinders upon a relative movement between said shafts, valve controlled passages leading from both the low and high pressure compartments into said cylinders above said pistons and an additional valve structure operating between said compartments for variably controlling the flow of liquid from the high to the low pressure compartments.

5. In a transmission mechanism of the character described, the combination with a driving and a driven shaft, of means for forming a driving connection between said shafts comprising a member rigidly carried by one of said shafts, a division wall structure dividing said member into high and low pressure compartments, a plurality of cylinders between said compartments, pistons movable within said cylinders, means located within the low pressure compartment and associated with the other of said shafts for coöperation with said pistons and arranged to successively move said pistons into their respective cylinders upon a relative movement between said shafts, a fluid medium and means whereby said medium is drawn into said cylinders above said pistons on one stroke of the pistons and expelled on the other, and means for controlling the flow of said fluid to resist movement of said pistons.

6. In a transmission mechanism of the character described, the combination with a driving and a driven shaft, of means for forming a driving connection between said shafts comprising a member rigidly carried by one of said shafts, a division wall structure dividing said member into high and low liquid pressure compartments, a plurality of cylinders between said compartments, pistons movable within said cylinders, means associated with the other of said shafts for coöperation with said pistons and arranged to successively move said pistons into their respective cylinders upon a relative rotative movement between said two shafts, valve controlled passages leading from said compartments into the top of said cylinders above said pistons, and an additional valve structure operating between said compartments and arranged to permit a plurality of different rates of flow of liquid from the high to the low pressure compartments.

7. In a transmission mechanism of the character described, the combination with a driving and a driven shaft, of means for forming a driving connection between said shafts comprising a member rigidly carried by one of said shafts, a division wall structure dividing said member into high and low liquid pressure compartments and formed with a plurality of radially arranged cylinders opening into the low pressure compartment at their lower ends, pistons movable within said cylinders and arranged to be successively moved into their respective cylinders upon a relative rotative movement between said two shafts, valve controlled passages leading from said compartments into the top of said cylinders above said pistons, and an additional valve structure operating between said compartments and arranged to permit a plurality of different rates of flow of liquid from the high and the low pressure compartment, said additional valve structure comprising a centrally bored stem provided with a plurality of lateral bores of different diameters arranged to be successively uncovered.

In testimony whereof I affix my signature.

ROMEO L. WILLIAMSON.